US 6,810,901 B2

(12) United States Patent
Burford

(10) Patent No.: US 6,810,901 B2
(45) Date of Patent: Nov. 2, 2004

(54) AIR COMPRESSOR WITH FOOT-ACTUATED CONDENSATE VALVE

(75) Inventor: Timothy W. Burford, New Ulm, MN (US)

(73) Assignee: Powermate Corporation, Aurora, IL (US)

(*) Notice: Subject to any disclaimer, the term of this patent is extended or adjusted under 35 U.S.C. 154(b) by 97 days.

(21) Appl. No.: 10/167,906

(22) Filed: Jun. 12, 2002

(65) Prior Publication Data

US 2003/0230341 A1 Dec. 18, 2003

(51) Int. Cl.[7] ................................................ F16K 31/62
(52) U.S. Cl. ............... 137/203; 137/899.4; 137/565.18; 251/99; 251/295
(58) Field of Search ............................ 137/203, 899.4, 137/565.18; 251/99, 295

(56) References Cited

U.S. PATENT DOCUMENTS

| 1,887,521 | A | | 11/1932 | Schenck |
|---|---|---|---|---|
| 3,977,426 | A | | 8/1976 | Pyle |
| 4,030,517 | A | | 6/1977 | Pyle |
| 4,768,542 | A | | 9/1988 | Morris |
| 4,877,218 | A | | 10/1989 | Kasner |
| 5,386,600 | A | | 2/1995 | Gilbert, Sr. |
| 5,433,410 | A | | 7/1995 | Foltz |
| 5,615,447 | A | | 4/1997 | Hardesty et al. |
| 2003/0039557 | A1 | * | 2/2003 | Burford et al. ............. 417/234 |

* cited by examiner

Primary Examiner—Gerald A. Michalsky
(74) Attorney, Agent, or Firm—Leydig, Voit & Mayer, Ltd.

(57) ABSTRACT

A foot-actuated condensate drain for an air compressor tank. The foot-actuated condensate drain includes a lever that is connected to a valve on the bottom of the air compressor tank. Movement of the lever, for example by a user's foot, causes the drain valve to open. The lever may be moved to a locked position where the drain valve is held in an open position, even if the user releases his or her foot. The valve stem of the valve is hollow and includes a seal for closing off the opening, and radial holes below the seal and in fluid communication with a hollow interior portion of the stem. When moved away from the closed position, fluid in the compressor tank flows out of the opening, around the seal, into the radial holes, through the stem, and out of the valve.

16 Claims, 3 Drawing Sheets

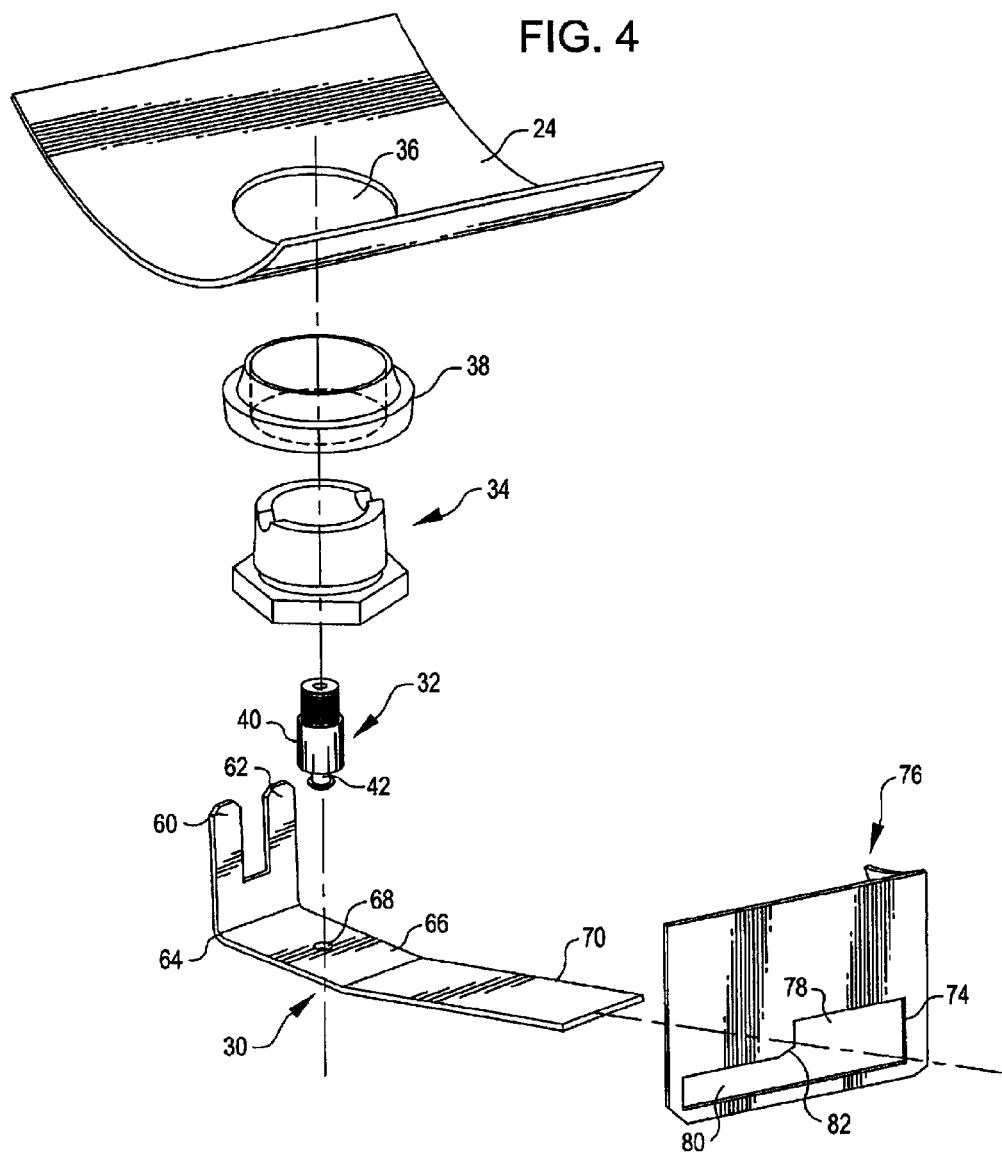

_US 6,810,901 B2_

AIR COMPRESSOR WITH FOOT-ACTUATED CONDENSATE VALVE

FIELD OF THE INVENTION

The present invention relates generally to power tools, and more particularly to air compressors.

BACKGROUND OF THE INVENTION

Air compressors are becoming commonplace in home workshops. In general, an air compressor, or an air pump, is a machine that decreases the volume and increases the pressure of a quantity of air by mechanical means. Air thus compressed possesses great potential energy, because when the external pressure is removed, the air expands rapidly. The controlled expansive force of compressed air is used in many ways and provides the motive force for air motors and tools, including pneumatic hammers, air drills, sandblasting machines, and paint sprayers.

A conventional home workshop air compressor includes a storage compressor tank for compressed air, and a prime mover mounted on the storage compressor tank for compressing the air in the compressor tank. The prime mover may be a gas engine or an electric motor, but most conventional home workshop models utilize electric power. The compressor tanks are typically steel and cylindrical in shape, and sizes vary greatly, but typically, home workshop models range between four and thirty gallons. An air compressor typically includes a pedestal of some kind (e.g., four feet) that allows the compressor to rest on a surface such as a floor. Alternatively, for some larger models, a pair of wheels may be provided on one end of the compressor tank and a handle on the other end, permitting the air compressor to be wheeled around a work shop, for example.

During the compression process in an air compressor, ambient air, which includes atmospheric humidity (i.e., water vapor), is drawn into the compressed air system where it is compressed to a desired discharge pressure. During the compression process, the water vapor is heated, and while stored in the compressor tank, the air and water vapor cool. Condensation is the moisture that drops out of the airflow as it cools. This condensation forms water in the bottom of the compressor tank, often called condensate. Condensate in an air compressor tank can cause many problems, such as rust and scale in the compressor tank, or water backup in the prime mover.

Most home workshop air compressors include a drain at a lower portion of the compressor tank to drain condensate out of the compressor tank. Although the condensate drains work well for their intended purpose, users often find the drains hard to access, because a user must stoop down and reach underneath the air compressor to release the drain. In addition, to fully drain the condensate, the user may have to hold the drain open for several seconds or longer to drain all condensate from the compressor tank. This process may be uncomfortable because of the inconvenient location of the drain. Moreover, the flow of condensate from the drain may be messy, because the condensate may disperse as a broad spray because of the configuration of the drain and the pressure in the compressor tank.

SUMMARY OF THE INVENTION

The present invention provides a foot-actuated condensate drain for an air compressor tank. In accordance with one aspect of the present invention, the foot-actuated condensate drain includes a lever that is connected to a valve on the bottom of the air compressor tank. Movement of the lever, for example by a user's foot, causes the drain valve to open.

In accordance with another aspect of the present invention, the lever may be moved to a catch position where the drain valve is held in an open position, even if the user releases his or her foot. In this manner, a user may step on the lever and slide it or move it into the catch position, thereby allowing the valve to continue draining even if the user removes his or her foot from the lever. The catch may be provided, for example, by a slot into which the lever may be moved sidewise, but which restricts movement of the lever in the direction (e.g., upwards) that closes the valve.

In accordance with a further aspect of the present invention, the valve is constructed so that condensate may flow out of the valve in an orderly, directed flow, for example in a thin stream straight downward. To this end, the valve includes a valve stem situated within a valve body. The valve stem is hollow and includes a seal for closing off the opening, and radial holes below the seal and in fluid communication with the hollow interior portion of the stem. A spring biases the valve stem into the closed position. When moved away from the closed position, fluid in the compressor tank flows out of the opening, around the seal, into the radial holes, through the stem, and out of the valve. The flow out of the stem is much more focused than the flow out of prior art drains or valves.

In accordance with one aspect of the present invention, the lever is attached to the stem, and downward movement of the lever causes a corresponding downward movement of the stem. To this end, the lever includes an extension that is situated opposite an actuation end of the lever and on an opposite side of the valve than the actuation end. The extension engages a surface near the bottom of the compressor tank and rotation of the lever occurs around this point of engagement. This arrangement allows the extension to act as a fulcrum, whereby leverage may be used to open the valve.

Other advantages will become apparent from the following detailed description when taken in conjunction with the drawings, in which:

BRIEF DESCRIPTION OF THE DRAWINGS

FIG. 4 is an exploded perspective view of the foot-actuated drain of FIG. 3;

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "rear," and the like, the orientations are to aid the reader in understanding the invention, and are not meant to be limiting.

Figure 1:
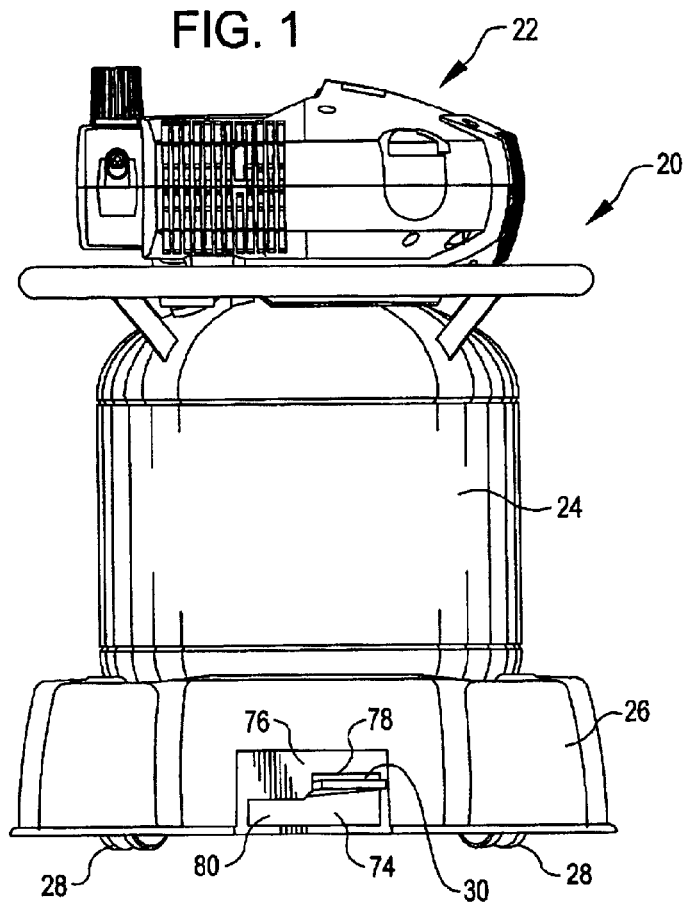
FIG. 1 is side view of an air compressor incorporating a foot-actuated drain in accordance with an aspect of the present invention.

Turning now to the drawing, in which like reference numerals represent like parts throughout the several views, FIG. 1 shows an air compressor 20 having a foot-actuated drain for a compressor tank 24 in accordance with the present invention. The structure and operation of the foot-actuated drain are described with reference to FIGS. 3 and 4, inter alia. The present invention also provides a novel construction for a valve 32 for use as part of the foot-actuated drain. The valve 32 is shown in detail in FIGS. 5 and 6.

A prime mover 22 for the air compressor 20 preferably includes an electric motor and a pump, but alternatively may utilize a gasoline engine and a pump. If an electric motor is used, a power cord (not shown, but known in the art) is provided for connecting the prime mover 22 to a power source. The operation and function of prime movers for air compressors are known, and are not described in detail here.

The air compressor 20 includes a compressor tank 24, for example a 20-gallon cylindrical compressor tank. The compressor tank 24 shown in the drawings is oriented in an upright, vertical position. However, the aspects of the present invention may be utilized for an air compressor having a compressor tank that is aligned horizontally or in other directions. Moreover, the shape of the compressor tank is not critical, and may be cylindrical or may have one of many other profiles.

Figure 2:
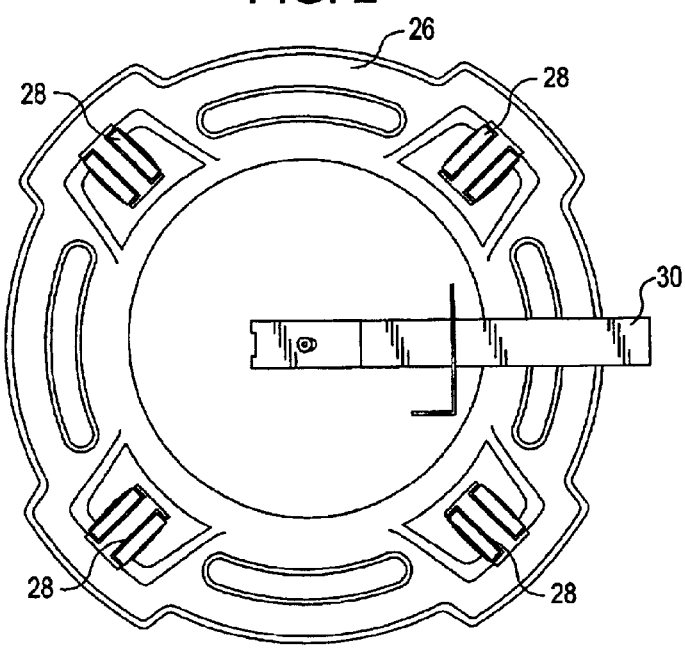
FIG. 2 is a bottom view of the compressor of FIG. 1.

In the embodiment shown in FIGS. 1 and 2, the compressor tank 24 rests on a base 26. The base 26 may be formed of a suitable plastic or metal, and stabilizes the compressor tank 24. Castor wheels 28, also shown in FIG. 2, are attached on the bottom of the base 26. The castor wheels may be plastic, solid or inflatable rubber, or any other suitable material, and are attached to the base 26 in a conventional manner, such as by a castor lock or via suitable brackets. Other bases, with or without wheels, may be utilized in an air compressor incorporating the present invention.

Figure 3:
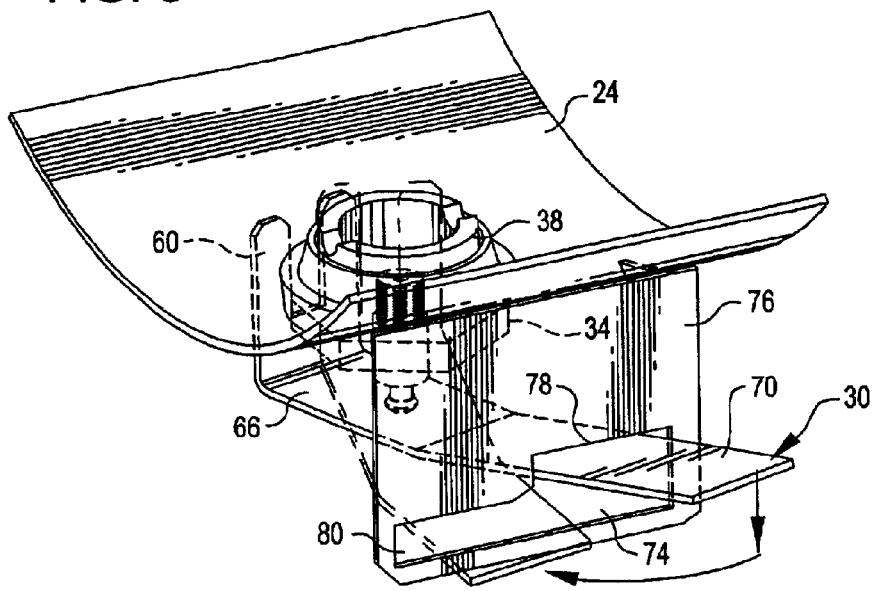
FIG. 3 is a partial cut-away view of a bottom of the compressor tank of the air compressor of FIG. 1, showing details of the foot-actuated drain of the air compressor, with a foot actuator for the drain shown moved to an open position in phantom.

Turning now to FIGS. 3 and 4, the air compressor 20 includes a lever 30 that is mounted underneath the bottom of the compressor tank 24. The lever 30 is attached to the bottom of a valve 32, the structure of which is further described below. In the embodiment shown, the lever is formed from a single piece of metal, but a lever may have two or more pieces and many different structures and still perform the functions of the invention.

The valve 32 is seated within a drain fitting 34 that fits onto the bottom of the compressor tank 24. The drain fitting 34 may include threads or a reducer to receive the valve 32. A collar 38 fits into an opening 36 (FIG. 4) in the bottom of the pan of the compressor tank 24 and is attached in a suitable manner, e.g., by welding. The drain fitting 34 is fitted into the collar 38, for example by threading or welding.

Figure 5:
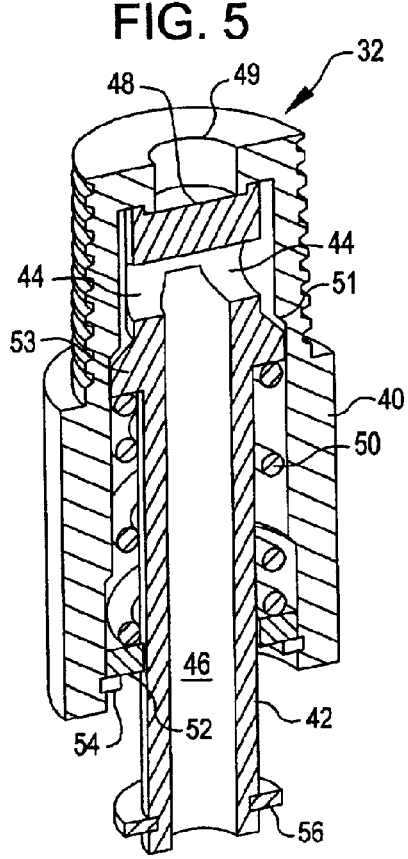
FIG. 5 shows a cut-away view of a valve for the foot-actuated drain of FIG. 3.
Figure 6:
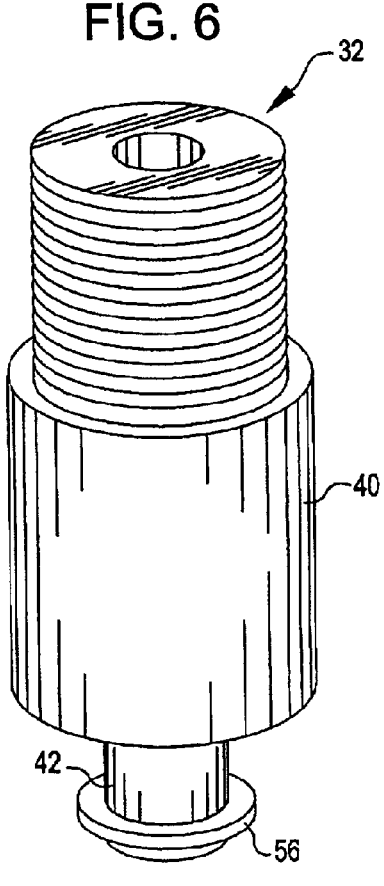
FIG. 6 is a side perspective view of the valve of FIG. 5.

As can be seen in FIG. 5, the valve 32 includes an outer valve body 40 having a stem 42 slidingly received therein. Holes 44 extend radially outward from an upper portion of the stem 42. The holes 44 are in fluid communication with a hollow passage 46 that extends along the stem's length. The radial holes 44 are located just below a seal 48 that is mounted on the upper end of the stem 42. The seal 48 is preferably formed of a deformable or compressible material, such as rubber, that may be used to block the flow of air out of the compressor. To this end, when the valve 32 is in a closed position such as is shown in FIG. 5, the seal 48 is seated against the bottom edge of a hole 49 that is in the upper portion of the valve body 40. As can be seen in FIG. 3, this upper portion of the valve body is in communication with the interior of the compressor tank 24.

Returning now to FIG. 5, the stem 42 fits within the interior of the valve body 40. The opening at the upper end of the interior of the valve body 40 is narrower than at a lower end. An internal shoulder 51 is located approximately one-third down the length of the valve body 40, at which the inner diameter of the interior of the valve body 40 increases. At this same location, when the valve 32 is in the closed position, an annular ring 53 mounted around or formed integral on the stem extends against and abuts the shoulder 51.

A spring 50 is mounted around the stem 42. A top end of the spring 50 abuts against the annular ring 53. A bottom end rests against a retainer plate 52 that is mounted at a bottom portion of the interior of the valve body 40. The retainer plate 52 includes an interior diameter that is slightly larger than the stem 42, so that the retainer plate slidingly receives the stem 42. The retainer plate 52 is held in place by a retainer clip 54, or may be attached in other ways, such as by crimping the valve body 40 at this location. A snap ring 56 is mounted on the distal end of the stem 42.

The valve body 40 and the stem 42 are preferably formed of a sturdy, rigid material such as hexagonal brass. Other suitable materials may be used. In accordance with one aspect of the present invention, the annular ring 53 is tightly toleranced within the inner diameter of the valve body 40, allowing free sliding movement of the stem 42 within the interior of the valve body 40, but not permitting much air flow around the annular ring 53. Likewise, the fitting of the stem 42 within the retainer plate 52 is tightly toleranced to permit free sliding of the stem, but to limit air flow. The function of the tight tolerances is described below.

As can be seen in FIG. 4, the lever 30 includes contact legs 60, 62 that extend upward from an elbow 64 formed in the lever 30. The elbow 64 in the embodiment shown in the drawings is a 90-degree turn from a flat central plate 66 of the lever 30. The flat central plate 66 includes a hole 68 in its center for receiving the distal end of the stem 42. The stem 42 fits through the hole 68, and the snap ring 56 fits on the opposite side of the lever 30 from the rest of the valve, thus tying the downward movement of the lever 30 with the stem 42. A foot extension 70 bends slightly upward from the flat central plate 66.

With reference to FIG. 3, the lever 30 is arranged so that it extends out of a slot 74 on a pedal plate 76. In the embodiment shown in the drawings, the pedal plate 76 is mounted on one side of the base 26, but the pedal plate or a similar suitable structure may be mounted as convenient on an appropriate part of the air compressor 20. For example, the pedal plate 76 may be welded to the bottom of the compressor tank 24. In such an embodiment, the base 26 may be omitted.

Referring again to FIG. 4, the slot 74 includes an upper slot opening 78 and a lower slot side passage 80, the combination of which forms an L-shape, with the base of the "L" extending upward and forming the upper slot opening 78. The upper slot opening 78 is preferably slightly wider than the lever 30, and the lower slot side passage 80 is preferably at least as wide as the lever 30. The lower slot side passage 80 extends orthogonally to the upper slot opening. A sloped edge 82 extends at the inside juncture of the upper slot opening 78 and the lower slot side passage 80.

In accordance with one aspect of the present invention, the valve 32 and the lever 30 form a foot-actuated condensate drain for the air compressor 20. The operation of the foot-actuated drain can be seen in FIG. 3. In a closed position, the foot extension 70 of the lever 30 extends out of the slot 74 through the upper slot opening 78. The contact legs 60, 62 engage a bottom portion of the pan for the compressor tank 24. The stem 42 is connected to the lever 30, but is biased into a position where the seal 48 is pressed to close the opening 49 at the upper end of the valve body 40.

In the closed position, the lever 30 rests against the bottom of the compressor tank 24 on the contact legs 60, 62. The foot extension 70 extends through the upper slot opening 78, but does not contact the top of the upper slot opening 78 or, if it does, the contact of the foot extension 70 with the top of the upper slot opening is closely toleranced so that the valve 32 is fully sealed. The bias of the spring 50 holds the foot extension 70 in this upward position.

To open the valve 32, a user steps on the foot extension 70 of the lever 30, causing the foot extension 70 to move downward, as the lever 30 rotates about the contact of the contact legs 60, 62 with the bottom of the compressor tank 24. The downward movement of the foot extension 70 causes a corresponding downward movement of the stem 42, because the stem 42 is attached to the flat central plate 66 of the lever 30 via the attachment of the snap ring 56 on the opposite side of the lever 30. In this manner, the contact legs 60, 62 act as a fulcrum for the lever 30.

When the stem 42 moves down, the seal 48 moves away from the opening 49, allowing fluids, such as air and condensate inside the air compressor, to flow out the opening 49 and around the seal 48. Because the annular ring 53 fits tightly within the inner diameter of the valve body 40, and the stem 42 fits tightly within the retainer plate 52, the majority of the air and the condensate flow into the radial holes 44 in the valve stem 42. The pressurized air and the condensate thus release to atmosphere and are free to flow out of the hollow passage 46 extending the length of the stem 42. This flow direction is beneficial, because in prior art drains, the condensate has a tendency to spray widely. In contrast, because of the flow of fluid out of the valve 32 is directed through the hollow stem 42, the valve 32 of the present invention provides a focused stream of condensate and pressurized air out of the compressor tank 24. This focused stream may be directed into a small bowl or bottle, and prevents most splattering of condensate out of the compressor, preventing a mess on a workshop or other floor.

When the foot extension 70 is at a lower position toward the bottom of the slot 74, the valve 32 is fully opened. A user may hold the foot extension 70 in this position until the condensate has flowed out of the compressor tank 24, or may slide the foot extension 70 sideways so that it fits within the lower slot side passage 80. In this position, the foot extension 70 may be released, and is caught against the top of the lower slot side passage 80. In this manner, the lower slot side passage 80 acts as a catch, securing the lever with the valve in the opened position. The valve 32 continues to be held open, without the user having to keep his or her foot on the foot extension 70.

After condensate is appropriately drained, the lever 30 may be slid back to the upper slot opening 78, permitting the valve 32 to close. This movement of the lever 30 may be done by a user's foot. The spring 50 biases the valve 32 and the lever 30 back into the closed position.

The sloped edge 82 makes movement of the foot extension 70 into the lower slot side passage 80 easier, in that if the foot extension 70 is not depressed downward the leading edge of the foot extension 70 engages the sloped edge 82, and is forced downward on the sidewise movement into the lower slot side passage 80.

Other catches may be used to hold the lever 30 in place, such as a strap, a magnet, a hook, or an appropriate lock and release mechanism. Other devices may be used as a catch, so long as they are capable of securing the lever with the valve in the opened position. The release of the catch may be manual, or may be automatic after a certain period of time.

The present invention provides a simple way for a user to drain condensate from a compressor tank without having to bend over or physically hold a drain open for an extended amount of time. Moreover, the present invention provides a relatively precise draining of the condensate so that splattering does not occur.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. An air compressor, comprising:
   a tank; and
   a condensate drain on the bottom of the tank, comprising:
      a valve operatively associated with the tank;
      a lever operatively associated with the valve, the lever being movable between a first position in which the lever opens the valve so that fluid may escape from the tank and a second position in which the valve is closed;
      a catch for securing the lever in the first position; and
      a slot through which an extension of the lever extends, the slot comprising the catch.

2. The air compressor of claim 1, wherein the slot comprises an opening into which the extension may extend when in second position, and a side passage into which the extension may extend when in the first position.

3. The air compressor of claim 2, wherein the side passage extends orthogonally from the opening.

4. The air compressor of claim 1, wherein the lever comprises a fulcrum located on an opposite side of the valve from the extension.

5. The air compressor of claim 4, wherein the valve comprises a valve body and a stem slidingly mounted in the valve body, and wherein the stem is connected to the lever.

6. The air compressor of claim 5, wherein the stem comprises a seal positioned to close an opening in the tank when the lever is in the second position.

7. The air compressor of claim 6, wherein the stem comprises a hollow passage extending at least a portion of its length, and at least one opening in fluid communication with the hollow passage and arranged so that at least some fluid flowing from the tank when the lever is in the first position flows out of the opening in the tank, through the at least one opening and though and out of the hollow passage.

8. The air compressor of claim 7, wherein the stem fits within a cavity in the valve body, and the stem further comprises an annular ring for directing fluid flow from the opening in the tank when the lever is in the first position to the opening in the stem.

9. An air compressor, comprising:
   a tank;
   a condensate drain on the bottom of the tank, comprising:
      a valve operatively associated with the tank;
      a lever operatively associated with the valve, the lever being movable between a first position in which the lever opens the valve so that fluid may escape from the tank and a second position in which the valve is closed;
      a catch for securing the lever in the first position; and
      the valve comprising a valve body and a stem slidingly mounted in the valve body, the stem being connected to the lever.

10. The air compressor of claim 9, wherein the stem comprises a seal positioned to close an opening in the tank when the lever is in the second position.

11. The air compressor of claim 10, wherein the stem comprises a hollow passage extending at least a portion of its length, and at least one opening in fluid communication with the hollow passage and arranged so that at least some fluid flowing from die tank when the lever is in the first position flows out of the opening in the tank, through the at least one opening and though and out of the hollow passage.

12. The air compressor of claim 11, wherein the stem fits within a cavity in the valve body, and the stem further comprises an annular ring for directing fluid flow from the opening in the tank when the lever is in the first position to the opening in the stem.

13. An air compressor, comprising:
   a tank;
   a valve for draining condensate from the tank and operable between opened and closed positions, comprising:
      a valve body having an opening in fluid communication with the tank and a cavity extending at least a portion of the length of the valve body, the cavity having internal walls;
      a stem slidingly mounted in the cavity of the valve body, an upper end of the stem being spaced from the internal walls and being maintained within the valve body when the valve is in the opened and closed positions;
      a seal on an end of the stem positioned to close the opening on the valve body when the valve is in the closed position;
      a hollow passage extending at least a portion of the length of the stem; and
      at least one opening in the stem and in fluid communication with the hollow passage; the stem, the cavity, and the opening being arranged so that at least some fluid flowing from the tank when the valve is in the opened position flows into the opening of the valve body, between the internal walls and the stem, through the at least one opening, and though and out of the hollow passage.

14. The air compressor of claim 13, wherein the stem fits within a cavity in the valve body, and the stem further comprises an annular ring for directing fluid flow from the opening in the tank when the valve is in the opened position to the opening in the stem.

15. An air compressor comprising:
   a tank;
   a foot-actuated drain for the tank,
      the foot-actuated drain comprising a lever connected to a valve;
      a catch for securing the drain in an open position; and
      a slot through which an extension of the lever extends, the slot comprising the catch.

16. The air compressor of claim 15, wherein the slot comprises an opening into which the extension may extend when the drain is open, and a side passage into which the extension may extend when the drain is closed.

* * * * *